United States Patent
Cui

(10) Patent No.: US 11,586,779 B2
(45) Date of Patent: Feb. 21, 2023

(54) EMBEDDED SYSTEM AND METHOD

(71) Applicant: Alibaba Group Holding Limited, Grand Cafyman (KY)

(72) Inventor: Xiaoxia Cui, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 182 days.

(21) Appl. No.: 17/078,953

(22) Filed: Oct. 23, 2020

(65) Prior Publication Data

US 2021/0124847 A1    Apr. 29, 2021

(30) Foreign Application Priority Data

Oct. 29, 2019   (CN) .......................... 201911039718.0

(51) Int. Cl.
*G06F 21/78* (2013.01)
*G06F 21/62* (2013.01)
*G06F 9/445* (2018.01)
*G06F 21/76* (2013.01)

(52) U.S. Cl.
CPC .............. *G06F 21/78* (2013.01); *G06F 9/445* (2013.01)

(58) Field of Classification Search
None
See application file for complete search history.

(56) References Cited

U.S. PATENT DOCUMENTS

| | | |
|---|---|---|
| 4,573,119 A | 2/1986 | Westheimer |
| 5,144,660 A | 9/1992 | Rose |
| 5,237,616 A | 8/1993 | Abraham |
| 5,471,599 A | 11/1995 | Brodnax |
| 8,862,901 B2 | 10/2014 | Rao |
| 9,396,137 B2 | 7/2016 | Nagai |
| 9,530,001 B2* | 12/2016 | Sallam ................. G06F 21/566 |
| 9,697,142 B2 | 7/2017 | Koeberl |
| 10,192,064 B2* | 1/2019 | Li ........................... G06F 12/14 |
| 10,223,290 B2* | 3/2019 | Depeyrot .............. G06F 9/3802 |
| 10,572,689 B2 | 2/2020 | Mittal |
| 11,188,321 B2* | 11/2021 | Miyamoto .............. G06F 21/51 |
| 11,336,287 B1* | 5/2022 | Rodriguez .......... G06F 15/7867 |
| 11,347,542 B2* | 5/2022 | Xia ......................... G06F 21/64 |
| 2003/0133574 A1 | 7/2003 | Caronni |

(Continued)

FOREIGN PATENT DOCUMENTS

| | | | |
|---|---|---|---|
| JP | 5518946 B2 | 6/2014 |
| JP | 6117068 B2 | 3/2015 |
| JP | 6370747 B2 | 11/2015 |

OTHER PUBLICATIONS

A Trojan-Resistant System-on-Chip Bus Architecture. Kim. IEEE. (Year: 2009).*

(Continued)

*Primary Examiner* — Venkat Perungavoor

(57) ABSTRACT

An embedded system and method, comprising a processor adapted to execute an instruction of an application program, where the instruction includes an access instruction for a hardware device; a memory adapted to store the instruction of the application program; and a physical memory protection apparatus coupled to the processor and the memory, where the access instruction accesses the hardware device through the physical memory protection apparatus.

21 Claims, 6 Drawing Sheets

(56) References Cited

U.S. PATENT DOCUMENTS

| | | | | |
|---|---|---|---|---|
| 2004/0215893 | A1* | 10/2004 | Emerson | G06F 12/0888 |
| | | | | 711/131 |
| 2005/0144408 | A1* | 6/2005 | Ejima | G06F 21/52 |
| | | | | 711/163 |
| 2009/0150645 | A1* | 6/2009 | Ono | G06F 12/1441 |
| | | | | 711/E12.078 |
| 2013/0297901 | A1* | 11/2013 | Nakada | G06F 12/1441 |
| | | | | 711/163 |
| 2016/0283402 | A1* | 9/2016 | Schulz | G06F 12/145 |
| 2018/0121125 | A1 | 5/2018 | Zeng et al. | |
| 2018/0157603 | A1 | 6/2018 | Schulz et al. | |
| 2019/0361818 | A1* | 11/2019 | Ichikawa | G06F 12/1458 |
| 2020/0264976 | A1* | 8/2020 | Hoogerbrugge | G06F 12/1441 |
| 2021/0334361 | A1* | 10/2021 | Ren | G06F 21/73 |

OTHER PUBLICATIONS

A Flexible Architecture for Systematic Implementation of SoC Security Policies. Basak. IEEE. (Year: 2015).*
Role-based Access Control for Memory Security on Network-on-Chips. Chen. IEEE. (Year: 2016).*
A large scale access-control list for IoT security comprising embedded IP-core and DDR DRAM. Inoue. IEEE. (Year: 2016).*

* cited by examiner

| | | | | | | |
|---|---|---|---|---|---|---|
| 0x0A | Storage space for executable code and a directory of the application program A | RX | -- | RX | RX | 321 |
| 0x0B | Storage space for executable code and a directory of the application program B | -- | RX | RX | RX | 322 |
| 0x0C | Storage space for executable code and a directory of the embedded operating system 122 | -- | -- | RX | RX | 323 |
| 0x0D | Storage space for executable code and a directory of the embedded operating system 124 | | | | RX | 324 |

Read-only memory 106

FIG. 4(b)

| | 0x3A | External device 111 | RW | RW | RW | RW | 331 |
|---|---|---|---|---|---|---|---|
| Hardware devices (including 111+112+113) | 0x3B | External device 112 | RW | RW | RW | RW | 332 |
| | 0x3C | One register | -- | -- | RW | RW | 333 |
| | | | | | | | |

FIG. 4(c)

| | 0x3A | ID1 |
|---|---|---|
| Exclusive access | 0x3B | ID2 |
| | | |

FIG. 4(d)

EMBEDDED SYSTEM AND METHOD

PRIORITY CLAIM

The present application claims priority to China Patent Application No. 201911039718 filed Oct. 29, 2019 and titled "A SYSTEM AND METHOD", incorporated herein by reference in its entirety.

TECHNICAL FIELD

The present invention relates to the field of chips, and more specifically, to an embedded system and an implementation method.

BACKGROUND

In the prior art, miniaturized and specialized electronic devices are gaining popularity. Computer systems of these devices provide tailor-made dedicated functions for the devices. Compared with traditional computer systems, the computer systems of these devices are referred to as embedded systems because they are completely embedded into the devices. A core of an embedded system is one or more pre-programmed microprocessors or single-chip microcomputers for performing a few tasks.

Wide use of embedded systems not only brings about the benefits of low power consumption and low-cost product manufacturing, but also increases security requirements for the embedded system. For example, in an Internet of Things application scenario, especially in the case of IoT devices like sensors, data generated by the sensors is of great significance to big data analysis for a user's business, helping the user with future business layout by providing valuable and massive data information. Therefore, this type of data is quite valuable to the user, and the user does not want the data to be accessed and operated by any other users, and needs to exclusively manage and operate the devices that generate the data. Similarly, for some devices in the field of industrial control, a user needs to control other devices such as street lights, motors, and wind power devices based on information from sensors. Once the information from sensors is tampered with, a huge serious disaster and unpredictable losses will occur. In a mobile application scenario, fingerprint or password based identity authentication is performed on many payment application programs. This requires that a fingerprint device or a password keyboard peripheral be a trusted device that is exclusively operated by the payment application program. It also requires that permission control be performed on a fingerprint or a password stored on the device. In a digital copyright application scenario, as national governments are increasingly strict with digital version management by requiring identity authentication on both video and audio peripherals of a device before video and audio streams are decrypted and finally played. For doing so, an application program also needs to exclusively manage the video and audio peripherals.

SUMMARY

In view of this, this solution proposes a system and a method to facilitate exclusive access to a hardware device.

To achieve this objective, the present invention provides a system including:

a processor adapted to execute an instruction of an application program, where the instruction includes an access instruction for a hardware device;

a memory adapted to store the instruction of the application program; and a physical memory protection apparatus coupled to the processor and the memory, where the access instruction accesses the hardware device through the physical memory protection apparatus, and the physical memory protection apparatus includes:

a register set adapted to store permission data, where the permission data includes data indicating that a specific application program has an exclusive access permission to a specific hardware device; and a physical memory arbiter adapted to use hardware logic to determine, based on the permission data, whether the access instruction is exclusive access of the specific application program for the specific hardware device, and handle the access instruction accordingly.

In some embodiments, the following is further included: a software part of secure monitor, which writes the permission data into the register set of the physical memory protection apparatus according to an application configuration table.

In some embodiments, when the secure monitor writes the permission data into the register set, execution of a verification step of the physical memory protection arbiter is triggered.

In some embodiments, the physical memory protection arbiter executes the following verification steps on the permission data:

comparing the new permission data with existing permission data in the register set;

if data indicating that a specific application program has an exclusive access permission to a specific hardware device included in the new permission data conflicts with the prior permission data, restarting the system or skipping performing the adding operation.

In some embodiments, the secure monitor runs in a privileged mode.

In some embodiments, the access instruction includes a device address of the hardware device, and the permission data includes a correspondence between device addresses for exclusive access and application program IDs.

In some embodiments, the register set includes:

a first register adapted to store an address range of a protection area;

a second register adapted to indicate a configuration property of the protection area; and a third register adapted to store the address range of the protection area and the application program ID, where the address range of the protection area is an address range of a plurality of storage locations of a conventional memory, or the device address of the hardware device.

In some embodiments, the determining, based on the permission data, whether the access instruction is an exclusive access instruction of the specific application program for the specific hardware device includes:

performing comparison based on a program pointer and the address range in the first register to determine an address range in which executable code of the application program is located;

determining an application program ID based on the address range in which the executable code of the application program is located;

comparing the device address included in the access instruction with an address range in the second register to determine whether the application program has an access permission to the device address; and when the application program has an access permission to the device address, searching the third register based on the device address, and comparing an application program ID in a retrieved record with the application program ID to determine whether the access instruction is an exclusive access instruction of the specific application program for the specific hardware device.

In some embodiments, the permission data in the register set is not modifiable after being written, but is lost after the system is shut down.

In some embodiments, the system is a system-on-chip.

In some embodiments, the physical memory protection apparatus is provided inside the processor.

In some embodiments, a loader is further included, which is adapted to load and execute the secure monitor at an initialization phase of the system.

In some embodiments, the secure monitor and the loader are stored in a read-only memory of the system.

According to a second aspect, the present invention provides a method, including:

receiving an access instruction from a processor, where the instruction includes an access instruction for a hardware device;

determining, based on the access instruction, an application program that issued the access instruction and a device address targeted by the access instruction; and determining, based on permission data, whether the access instruction is an exclusive access instruction of a specific application program for a specific hardware device, and rejecting or continuing the access instruction accordingly.

In some embodiments, the following is further included: when the permission data is written, triggering execution of the following verification steps on the new permission data:

comparing the new permission data with existing permission data; and if data indicating that a specific application program has an exclusive access permission to a specific hardware device included in the new permission data conflicts with the prior permission data, restarting the system or skipping performing the adding operation.

In some embodiments, the access instruction includes a device address of the hardware device, and the permission data includes a correspondence between device addresses for exclusive access and application program IDs.

According to the embodiments of the present invention, the physical memory protection arbiter uses the hardware logic to verify, by using the permission data, access instructions from the processor, and rejects an access instruction for an exclusively occupied hardware device from an application program not specified in the permission data. This ensures exclusive access of an application program to the hardware device.

BRIEF DESCRIPTION OF DRAWINGS

The above and other objectives, features and advantages of the present invention will become more apparent from the description of the embodiments of the present invention with reference to the following accompanying drawings. In the drawings.

DESCRIPTION OF EMBODIMENTS

The present invention is described below based on embodiments, but the present invention is not limited to these embodiments. In the following detailed description of the present invention, some specific details are described. Without the description of such details, those skilled in the art can still fully understand the present invention. To avoid confusing the essence of the present invention, well-known methods, processes, and procedures are not described in detail. In addition, the accompanying drawings are not necessarily drawn to scale.

Figure 1:
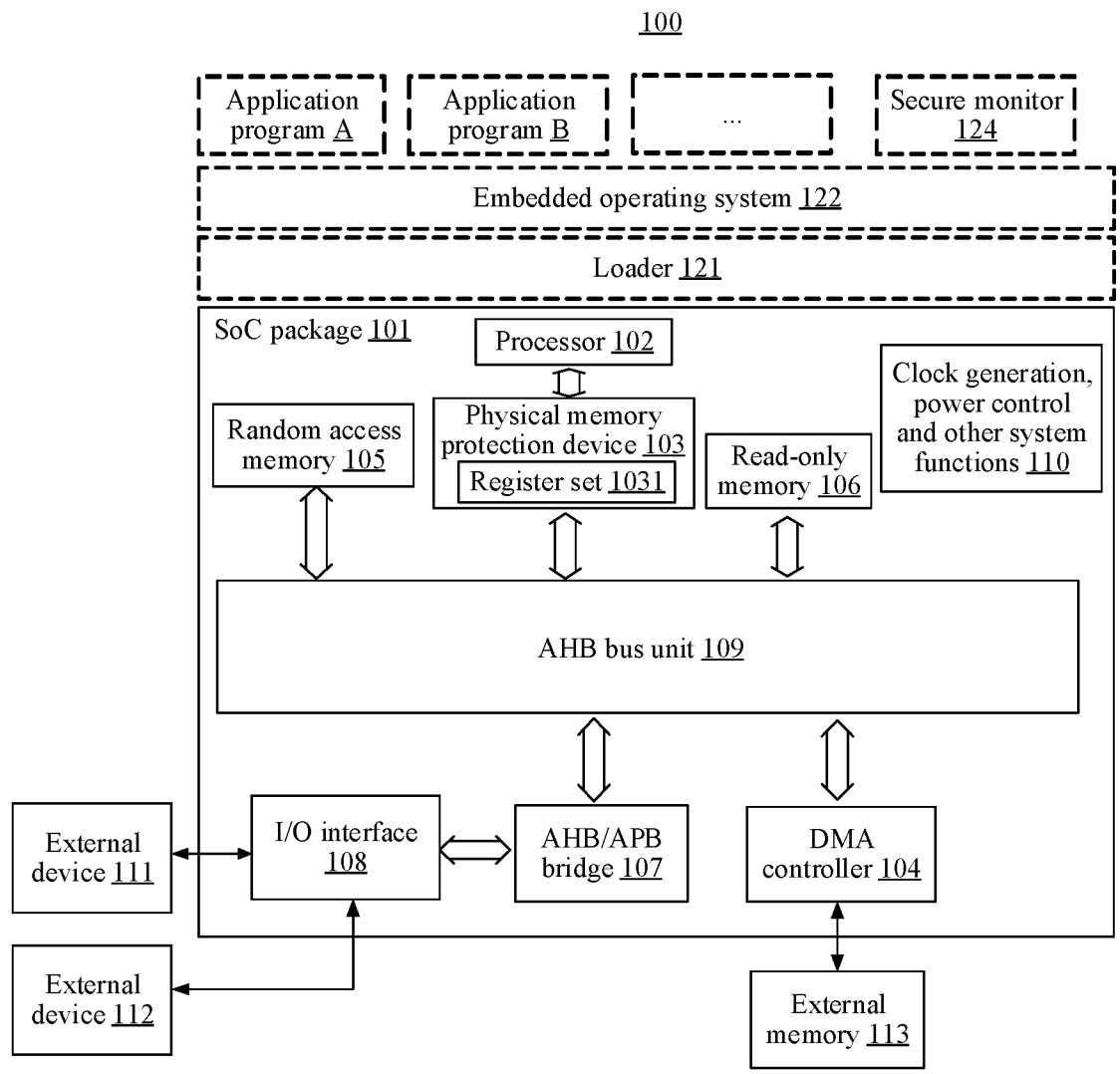
FIG. 1 is a schematic structural diagram of a system used for implementing an embodiment of the present invention.

FIG. 1 is a schematic structural diagram of a system used for implementing an embodiment of the present invention. As shown in FIG. 1, a system 100 includes a processor 101 coupled to a physical memory protection apparatus 103. Different from the figure, the physical memory protection apparatus 103 may alternatively be provided inside the processor 101. The physical memory protection apparatus 103 is adapted to implement, based on permission data, access control on access instructions, issued by the processor, for storage locations of a conventional memory and hardware devices (device I/Os mapped through MMIO or PMIO), and if an access instruction intends for exclusive access to a hardware device, ensure that only one application program can access an exclusively occupied hardware device. The physical memory protection apparatus 103 includes a register set 1035 adapted to store the permission data, and may determine, based on the permission data, whether access to the storage locations of the conventional memory and the hardware devices by various subjects (including application programs, an embedded operating system, and the like) are appropriate, and handle the access instructions accordingly. MMIO is memory-mapped I/O (Memory-mapped I/O), and PMIO is port-mapped I/O (Port-mapped I/O).

In this example, communication between the processor 101 and all other elements may be performed through the physical memory protection apparatus 103, or regulated by the physical memory protection apparatus 103 in another manner. In the another manner, some access instructions of the processor 101 to the memory, for example, may pass through the physical memory protection apparatus 103. For example, the processor 101 also includes a plurality of internal registers, and access instructions, for the plurality of registers, executed inside the processor may not pass through the physical memory protection apparatus 103.

In this example, the system 100 further includes a DMA controller 104, a random access memory 105, a read-only memory 106, an AHB/APB bridge 107, an I/O interface 108, and clock generation, power control and other system functions 110 that are coupled to the physical memory protection apparatus 103 through an AHB bus unit 109. As shown in the figure, these elements are packaged in a system-on-chip (SoC) 101. A designer may configure an SoC architecture so that communication between various elements of the system-on-chip 101 is secure.

In this example, the system 100 further includes external devices 111 and 112 connected to the system-on-chip through the I/O interface 108, and an external memory 113 connected to the system-on-chip 101 through the DMA controller 104. The external devices 111 and 112 may be, for example, text, audio, and video input/output devices and other memories that are not controlled by the DMA controller. The system-on-chip 101 may access an off-chip external device through the I/O interface 108. Different from the memory 105 provided in the system-on-chip, the off-chip memory may have a larger capacity, a lower cost, and a slower speed. For example, the memory 105 is a static random access memory (SRAM), and the off-chip memory is a DRAM (dynamic random access memory) or a flash (flash) memory.

In this example, the system 100 may further include various software. A loader 121, an embedded operating system 122, application programs A and B, and a secure monitor (Secure Monitor) 124 are shown in the figure. All the software may be hard coded into the read-only memory 106 or stored in the off-chip memory. Generally, the loader 121, the secure monitor 124, and the embedded operating system 122 are hard coded into the read-only memory 106, and the application programs A and B may be stored in the off-chip memory. In some cases, the loader 121 and the embedded operating system 122 may alternatively be combined into one. For the software, the loader 121 may be adapted to perform verification and load various software into the random access memory 105. The loader 121 itself may be software loaded in a secure manner. The system-on-chip 101 may be adapted to retrieve the loader 121 from the read-only storage 106 immediately or soon after the system is powered on or reset, then determine which software to load based on configuration information, and then load corresponding software into the random access memory 105 based on verification results on the software, for example, determining whether to load software based on a source of the software, a fingerprint, or a certificate. In one implementation, the embedded operating system 122 may determine, based on a system environment, when to load and execute the secure monitor 124. In another implementation, during a power-on initialization phase of the system, the loader 121 loads and executes the secure monitor 124 according to configuration information.

The secure monitor 124 is adapted to write permission data into the register set 1035 of the physical memory protection apparatus 103 according to an application configuration table. The application configuration table may include resource information used by various application programs, as well as requirements for exclusive access to hardware devices. The application configuration table may be formulated based on compilation information of the application program and stored in a specific location (for example, in the read-only memory 106). The permission data includes access permissions of various subjects (including the application program, the embedded operating system, and the like) to the resource information. It should be noted that the secure monitor 124 needs to have a write permission to the register of the physical memory protection apparatus 103. Therefore, it must be ensured that the secure monitor 124 has the corresponding write permission. For processors of different architectures, the conditions required for the secure monitor 124 to have the write permission may be different. For example, for a RISC-V architecture processor, the secure monitor 124 may be executed in a machine privilege mode (Machine Privilege). If the processor is an ARM architecture processor, the secure monitor 124 may be executed in a system (system) mode or supervisor (supervisor) mode.

Some application programs may be independent of the embedded operating system 122 and loaded by the loader 121, and some application programs may be dependent on the embedded operating system 122 and loaded and controlled by the embedded operating system 122. For example, the secure monitor 124 may serve as an application program independent of the embedded operating system 122. The application programs (including A and B) may include, but are not limited to, programs for controlling or responding to external devices (for example, a biometric sensor, a printer, a microphone, a speaker, a flow valve, or other I/O components, sensors, actuators, or devices), programs for various I/O tasks, security programs, verification programs, various computing modules, communication programs, communication support protocols, or other programs, or combinations thereof.

Certainly, this embodiment is only exemplary description. The present invention may alternatively be implemented in other software and hardware structures. For example, the present invention may be implemented on a computer system of an X86 architecture, including a processor, a memory, and an I/O device that are connected through a bus. The processor may be various types of processors currently available on the market, and driven by an operating system such as a WINDOWS™ operating system, a UNIX operating system, or a Linux operating system. In addition, even if the system-on-chip shown in the figure is used, components thereof may be different in many terms. For example, there are a plurality of choices for a bus structure, for example, using an OCP (Open Core Protocol) bus protocol or an on-chip bus independently developed in a specific field. Therefore, the bus structure may or may not include a bridging unit such as the AHB/APB bridge.

In addition, in an optional embodiment, the physical memory protection apparatus 103 may further include an enable input terminal. When the processor inputs an enable signal to the enable input terminal, the physical memory protection apparatus 103 is enabled. The physical memory protection apparatus 103 rejects or continues an access instruction according to the foregoing embodiment. Making the enable input terminal a switch option of the physical memory protection apparatus 103 is helpful to adjust use of the memory protection apparatus in real time based on a security level requirement.

Figure 2:
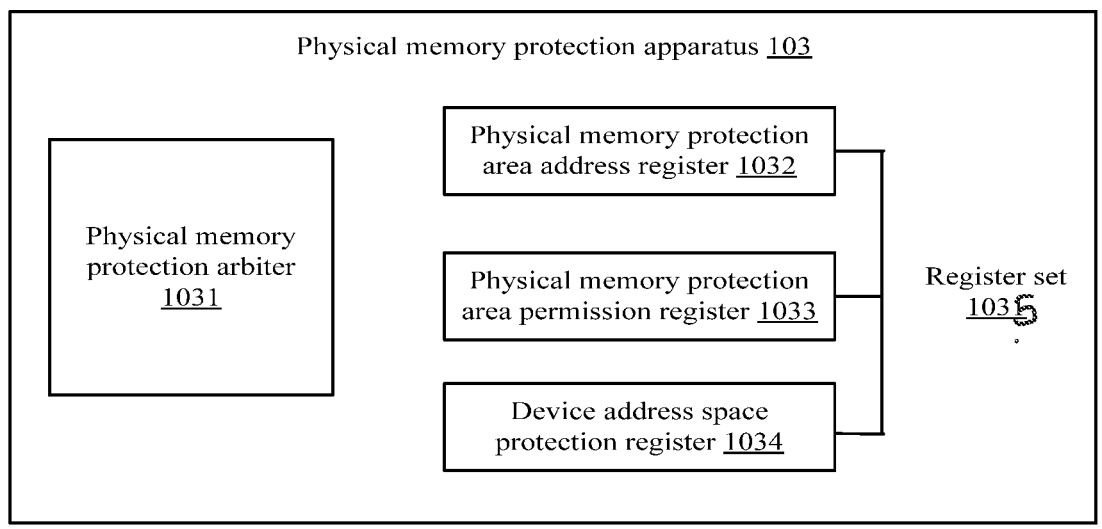
FIG. 2 is a schematic structural diagram of a physical memory protection apparatus in FIG. 1.

FIG. 2 is a schematic structural diagram of a physical memory protection apparatus in FIG. 1. As shown in FIG. 2, the physical memory protection apparatus 103 includes a physical memory protection area address register 1032, a physical memory protection area permission register 1033, a device address space protection register 1034, and a physical memory protection arbiter 1031. These three sets of registers include a plurality of registers adapted to store the permission data. The physical memory protection area address register 1032 stores an address range of a protection area, including an address range of the storage locations of the conventional memory and device addresses of device I/O ports mapped through MMIO or PMIO. Permission data stored in the physical memory protection area permission register 1033 is used to indicate a configuration property of a protection area, and the configuration property includes an address range matching mode. For example, in an RISC-V architecture based processor, the mode may be one of a user mode, an administrator mode, a hypervisor mode, and a machine privilege mode. The configuration property further includes an access permission to the address range (device addresses and storage locations of the conventional memory), for example, R for read, W for write, and X for execute. The device address space protection register 1034 is used for a device address and an application program ID exclusively occupying the hardware device. In addition, for the permission data, a "lock" property of the register may be set, so that the permission data cannot be modified after being written, but is lost after the system is restarted and rewritten when the system is powered on. This ensures that requirements for exclusive access to hardware devices can be adjusted based on actual needs.

In this example, the physical memory protection arbiter 1031 is a logic circuit for memory protection check and executes hardware logic. The physical memory protection arbiter 1031 includes the following two functions: (1) check whether the specified protection area is valid; and (2) arbitrate whether an access instruction is legal.

For function (1), when the secure monitor 124 writes a new piece of permission data into the device address space protection register 1034, execution of the physical memory protection arbiter 1031 is triggered. The physical memory protection arbiter 1031 reads existing permission data in the device address space protection register 1034 and compares it with the new permission data. The physical memory protection arbiter 1031 takes responsive protection measures (for example, rejecting execution or restarting the system) once finding that two different application programs both have an exclusive access permission to one hardware device, or that one application program has an exclusive access permission to a hardware device while another application program has an execution permission to the hardware device, which means that the new permission data conflicts with the existing permission data. If no data conflict is found, it is considered that the resource area configuration of the device is valid and the adding operation is allowed to proceed.

Figure 3:
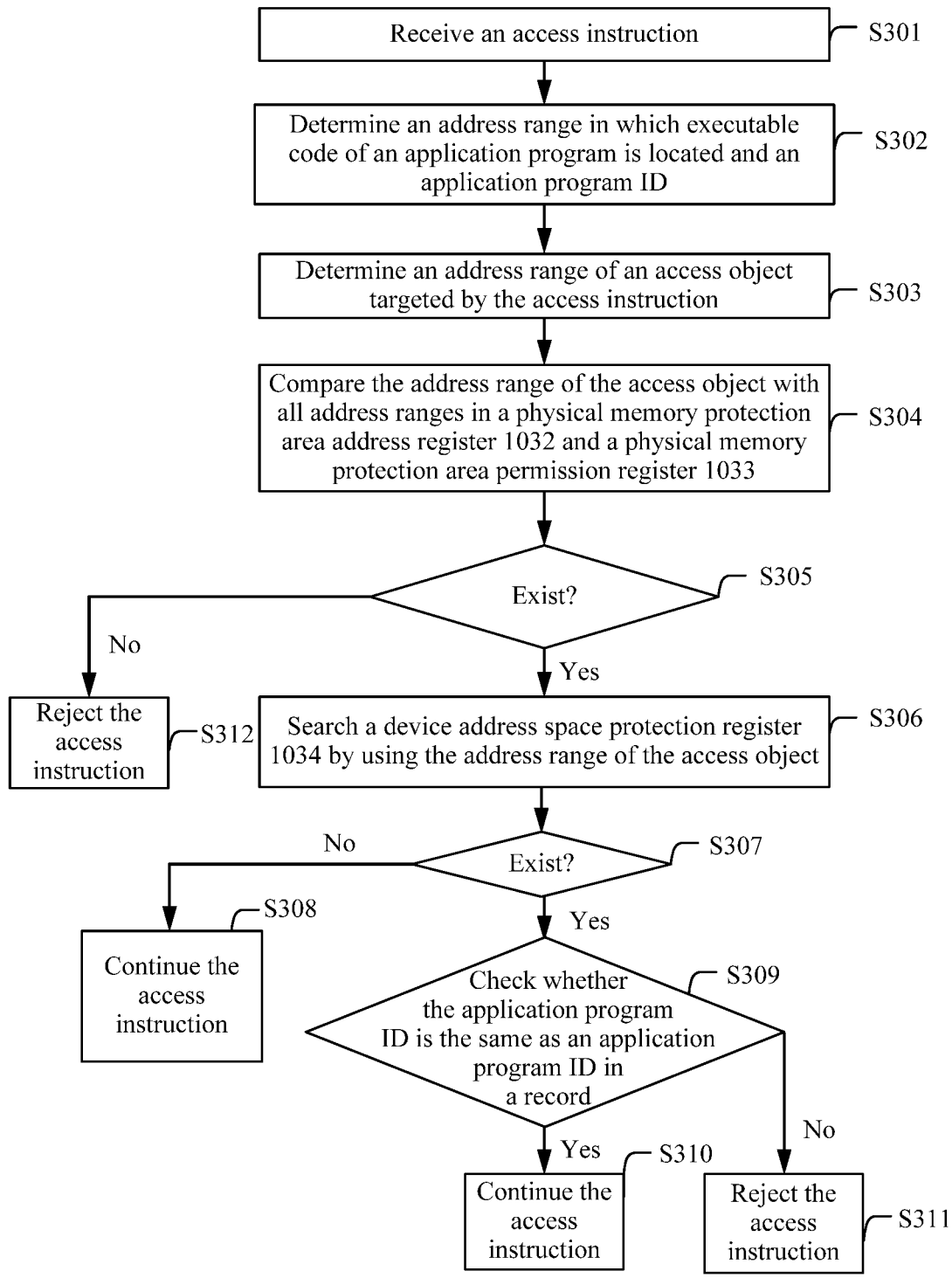
FIG. 3 is a flow chart of verifying an access instruction by a physical memory protection arbiter.

For function (2), the flowchart shown in FIG. 3 is used to demonstrate hardware logic of arbitrating whether any access instruction is legal by the physical memory protection arbiter 1031.

Step 301. Receive an access instruction from the processor.

Step 302. Perform comparison based on a program pointer and the address range of the physical memory protection area address register 1032 to determine an address range in which executable code of an application program is located and an application program ID.

Step S303. Determine an address range of an access object targeted by the access instruction. The access instruction may or may not include an indication of the access object. If the access instruction includes an indication of the access object, the address range is acquired based on the indication of the access object. The indication of the access object may be acquired from a step of decoding executable code by the processor. If the access instruction does not include an indication of the access object, the physical memory protection arbiter 1031 may proactively grab the executable code being processed from the processor to acquire the indication of the access object.

Step S304. Separately compare the address range of the access object with all address ranges in the physical memory protection area address register 1032 and the physical memory protection area permission register 1033.

Step S305. Determine whether the address range of the access object exists in these address ranges. When the address range of the access object exists in both the memory protection area address register 1032 and the physical memory protection area permission register 1033 and has corresponding permissions, it indicates that the application program can access the address range, and step S306 is executed. Otherwise, step S312 is executed.

Step S306. Search the device address space protection register 1034 by using the address range of the access object.

Step S307. Determine whether the address range of the access object exists in the device address space protection register 1034. If a corresponding record exists, step S309 is executed. Otherwise, step S308 is executed.

Step S308. Continue the access instruction. Specifically, this is to send the access instruction to a corresponding conventional memory or a corresponding hardware device.

Step S309. Check whether the application program ID is the same as an application program ID in the record. If yes, step S310 is executed. Otherwise, step S311 is executed.

Step S310. Continue the access instruction.

Step S311. Reject the access instruction.

Step S312. Reject the access instruction.

Continuing the access instruction is sending the access instruction to the corresponding conventional memory or the corresponding hardware device. Rejecting the access instruction is skipping handling the access instruction or sending information of rejecting the access instruction to the processor.

In this example, function (1) of the physical memory protection arbiter 1031 can ensure that no two or more application programs have an exclusive access permission to a same hardware device in the permission data; and function (2) can ensure that when another application program (rather than the application program specified in the permission data as to have exclusive access) accesses an exclusively occupied hardware device, the access instruction is rejected, thereby ensuring exclusive access of the application program to the hardware device.

Writing the permission data by the security monitor 124 includes first and second steps whereby permission data is separately written into the physical memory protection area address register 1032 and the physical memory protection area permission register 1033 according to the application configuration table. In third and a fourth steps, verifying whether a current access instruction indicates exclusive access to a hardware device is determined, and if yes, writing the permission data into the device address space protection register 1034 is continued.

Figure 4A:
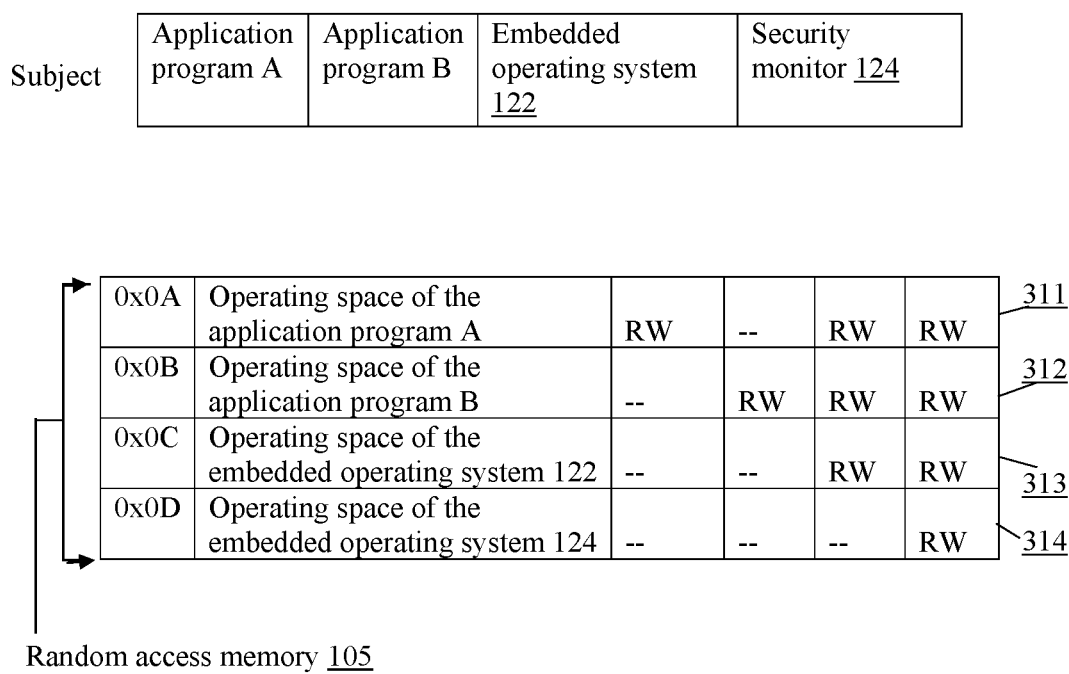
FIGS. 4(*a*), 4(*b*), 4(*c*) and 4(*d*) are schematic diagrams of exemplary permission data.

FIG. 4(*a*) to FIG. 4(*d*) are schematic diagrams of exemplary permission data. FIG. 4(*a*), FIG. 4(*b*), and FIG. 4(*c*) show resource information and access permissions (non-exclusive access) of various subjects to the resource information (including conventional memories and hardware devices). FIG. 4(*a*) shows access permissions to storage locations of the random access memory 105. FIG. 4(*b*) shows access permissions to storage locations of the read-only memory 106, and FIG. 4(*c*) shows access permissions to the hardware devices. The data is stored in the physical memory protection area address register 1032 and the physical memory protection area permission register 1033. FIG. 4(*d*) shows a correspondence between device IDs of hardware devices and application program IDs. The data is stored in the device address space protection register 1034, indicating exclusive access.

Referring to FIG. 4(*a*), the random access memory 105 includes an operation space (row 311) of the application program A, an operation space (row 312) of the application program B, an operation space (row 313) of the embedded operating system 122, and an operation space (row 314) of the secure monitor 124, which are defined by physical addresses or virtual addresses. Data in the last four columns of row 311 represents access permissions of the application programs A and B, the embedded operating system 122, and the secure monitor 124 to the operation space of the application program A. As shown in the figure, the application program A, the embedded operating system 122, and the secure monitor 124 all have read and write permissions to the operation space of the application program A. In this example, the embedded operating system 122 and the secure monitor 124 may be set to run in a privileged mode, while the application programs A and B run in a user mode. Data in the last four columns of row 312 represents access permissions of the application programs A and B, the embedded operating system 122, and the secure monitor 124 to the operation space of the application program B. As shown in the figure, the application program B, the embedded operating system 122, and the secure monitor 124 all have read and write permissions to the operation space of the application program B. Data in the last four columns of row 313 represents access permissions of the application programs A and B, the embedded operating system 122, and the secure monitor 124 to the operation space of the embedded operating system 122. As shown in the figure, both the embedded operating system 122 and the secure monitors 124 have read and write permissions to the operation space of the embedded operating system 122. Data in the last four columns of row 314 represents access permissions of the application programs A and B, the embedded operating system 122, and the secure monitor 124 to the operation space of the secure monitor 124. As shown in the figure, only the secure monitor 124 has read and write permissions to the operation space of the secure monitor 124.

Referring to FIG. 4(*b*), the read-only memory 106 includes a storage space for executable code and a directory of the application program A, a storage space for executable code and a directory of the application program B, and a storage space for executable code and a directory of the embedded operating system 122, and a storage space for executable code and a directory of the secure monitor 124, for which address ranges are defined by physical addresses or virtual addresses. Data in the last four columns of rows 321 to 324 represents access permissions of the application programs A and B, the embedded operating system 122, and the secure monitor 124 to the these storage spaces.

Referring to FIG. 4(*c*), various hardware devices (including devices 111 to 113) may correspond to respective device addresses through MMIO or PMIO. The last four columns of row 331 show access permissions of the application programs A and B, the embedded operating system 122, and the secure monitor 124 to the external device 111. Row 332 shows access permissions of the application programs A and B, the embedded operating system 122, and the secure monitor 124 to the external device 112. Row 333 shows access permissions of the application programs A and B, the embedded operating system 122, and the secure monitor 124 to a specified register.

Referring to FIG. 4(*d*), ID 1 is an ID of the application program A, and ID 2 is an ID of the application program B. As shown in the figure, the application program A has an exclusive access permission to the external device 111 (corresponding to a device address of the external device 111), and the application program B has an exclusive access permission to the external device 112 (corresponding to a device address of the external device 112). The ID may be represented by an address range (corresponding to data in the first column in FIG. 4(*a*), and the address range is unique during a running period of the application program) in the operation space of the application program A. Certainly, this is not limited in the present invention.

When an application program has read and write permissions to an operation space of an application program, it indicates that the application program can perform operations such as setting a code segment or a data segment, building a stack, and storing code and data in the corresponding storage operation space. When an application program has read and execute permissions to a storage space of a directory and executable code of the read-only memory, it indicates that the application program can enter the corresponding directory and start executable code in the directory.

It should be noted that the foregoing structure design of the permission data is only an exemplary description, and those skilled in the art may also adopt different structure designs and/or data organizations to complete the technical solution of the present invention. For example, it is possible to use only the physical memory protection area address register 1032 and the physical memory protection area permission register 1033 to store permission data for exclusive access. Then, when an application program has an exclusive access permission to a specific hardware device, the secure monitor 124 modifies the permission data in the two sets of registers, so that only the application program and none of other application programs has read and write permissions to the hardware device. For another example, the physical memory protection area address register 1032 and the physical memory protection area permission register 1033 store access permissions for users to resource information, assigned by an operating system. Then, application programs started by a corresponding user have the same access permission to the corresponding resource information. In addition, permission data in the device address space protection register 1034 is used to indicate exclusive access.

In addition, it should also be noted that the hardware device for exclusive access in the present invention is not limited to the external devices off the system-on-chip 101 shown in the figure, but may be any element on the system-on-chip 101.

Based on the above, it is conceivable that if an attacker modifies the application configuration table (in this configuration table, the application program B is so configured as to have access to an external device configured for the application program A), acquires a highest operation permission, and then calls the secure monitor to write data in the modified application configuration table into the register set, that is, permission data indicating that the application program B can access the external device of the application program A is added to a corresponding register. However, the device address space protection register 1034 has recorded that the hardware device of the application program A is for exclusive occupation by the application program A, so when it is recorded that the application program B can access the hardware device configured for the application program A, the physical memory protection arbiter 1031 takes responsive protection measures (for example, stopping execution or restarting). Based on the foregoing steps, it is implemented that the hardware device configured for the application program A cannot be allocated to the application program B. In addition, the physical memory protection arbitrator rejects all access attempts that are not from the application program A to the hardware device configured for the application program A. Through the two-layer protection of software and hardware logic, it is implemented that the application program A has exclusive access to the external device configured for the application program A.

According to the present invention, the above processing unit, processing system, and electronic device may be implemented in hardware, a dedicated circuit, software, or logic, or any combination thereof. For example, some aspects may be implemented in hardware, and other aspects may be implemented in firmware or software executable by a controller, a microprocessor, or other computing devices. The present invention is not limited thereto though. Although the various aspects of the present invention may be illustrated and described as block diagrams or flowcharts, or using some other graphical representations, it is well understood that, as non-limiting examples, the blocks, apparatuses, systems, techniques or methods described herein may be implemented in hardware, software, firmware, a dedicated circuit, logic, general hardware, a controller, or other computing devices, or some combination thereof. If involved, the circuit design of the present invention may be implemented in various components such as an integrated circuit module.

The above are merely preferred embodiments of the present invention and are not intended to limit the scope of present invention. For those skilled in the art, the present invention may have various modifications and variations. Any modification, equivalent replacement, or improvement made without departing from the spirit and principle of the present invention shall fall within the protected scope of the present invention.

What is claimed is:

1. A system, comprising:
a processor adapted to execute an instruction of an application program, wherein the instruction comprises an access instruction for a hardware device;
a memory adapted to store the instruction of the application program; and
a physical memory protection apparatus coupled to the processor and the memory, wherein
the access instruction accesses the hardware device through the physical memory protection apparatus.

2. The system according to claim 1, further comprising a software part of a secure monitor, which writes permission data into a register set of the physical memory protection apparatus according to an application configuration table.

3. The system according to claim 2, wherein when the secure monitor writes the permission data into the register set, execution of a verification step of a physical memory protection arbiter is triggered.

4. The system according to claim 3, wherein the physical memory protection arbiter executes the following verification steps on the permission data:
comparing new permission data with existing permission data in the register set;
if data indicating that a specific application program has an exclusive access permission to a specific hardware device comprised in the new permission data conflicts with existing permission data, restarting the system or skipping performing an adding operation.

5. The system according to claim 2, wherein the secure monitor runs in a privileged mode.

6. The system according to claim 2, wherein the access instruction comprises a device address of the hardware device, and the permission data comprises correspondence data between the hardware device addresses for exclusive access and the application program IDs.

7. The system according to claim 6, wherein a register set comprises:
a first register adapted to store an address range of a protection area;
a second register adapted to indicate a configuration property of the protection area; and
a third register adapted to store the address range of the protection area and the application program ID, wherein
the address range of the protection area is an address range of a plurality of storage locations of a conventional memory, or the device address of the hardware device.

8. The system according to claim 7, wherein a determination, based on the permission data, whether the access instruction is an exclusive access instruction of the specific application program for the specific hardware device comprises:
performing comparison based on a program pointer and the address range in the first register to determine an address range in which executable code of the application program is located;
determining an application program ID based on the address range in which the executable code of the application program is located;
comparing the device address comprised in the access instruction with an address range in the second register to determine whether the application program has an access permission to the device address; and
when the application program has an access permission to the device address, searching the third register based on the device address, and comparing an application program ID in a retrieved record with the application program ID to determine whether the access instruction is an exclusive access instruction of the specific application program for the specific hardware device.

9. The system according to claim 2, wherein the permission data in the register set is not modifiable after being written but is lost after the system is shut down.

10. The system according to claim 1, wherein the system is a system-on-chip.

11. The system according to claim 1, wherein the physical memory protection apparatus is provided inside the processor.

12. The system according to claim 2, further comprising a loader adapted to load and execute the secure monitor at an initialization phase of the system.

13. The system according to claim 12, wherein the secure monitor and the loader are stored in a read-only memory of the system.

14. A method, comprising:
receiving an access instruction from a processor, wherein the instruction comprises an access instruction for a hardware device;
determining, based on the access instruction, an application program that issued the access instruction and a device address targeted by the access instruction; and
determining, based on permission data, whether the access instruction is an exclusive access instruction of a specific application program for a specific hardware device, and rejecting or continuing the access instruction accordingly, wherein the permission data comprises data indicating that a specific application program has an exclusive access permission to a specific hardware device.

15. The method according to claim 14, further comprising: when the permission data is written, triggering execution of the following verification steps on the new permission data:
comparing the new permission data with existing permission data; and
if data indicating that a specific application program has an exclusive access permission to a specific hardware device comprised in the new permission data conflicts with the prior permission data, restarting the system or skipping performing the adding operation.

16. The method according to claim 15, wherein the access instruction comprises a device address of the hardware device, and the permission data comprises a correspondence between device addresses for exclusive access and application program IDs.

17. The method according to claim 14, wherein the determining, based on permission data, whether the access instruction is an exclusive access instruction of a specific application program for a specific hardware device comprises:
performing comparison based on a program pointer and the address range in a first register to determine an address range in which executable code of an application program is located;
determining an application program ID based on the address range in which the executable code of the application program is located;
comparing the device address comprised in the access instruction with an address range in a second register to determine whether the application program has an access permission to the device address; and
when the application program has an access permission to the device address, searching a third register based on the device address, and comparing an application program ID in a retrieved record with the application program ID to determine whether the access instruction is an exclusive access instruction of the specific application program for the specific hardware device.

18. The method according to claim 14, wherein the permission data in a register set of the hardware device is not modifiable after being written but is lost after the hardware device is shut down.

19. The method according to claim 14, wherein the hardware device is embedded in a system-on-a chip.

20. The method of claim 14, wherein the access instruction accesses the hardware device through a physical memory protection apparatus.

21. A physical memory protection apparatus comprising:
a register set adapted to store permission data, wherein the permission data comprises data indicating that a specific application program has an exclusive access permission to a specific hardware device; and
a physical memory arbiter adapted to use hardware logic to determine, based on the permission data, whether an access instruction is an exclusive access instruction of the specific application program for the specific hardware device, and reject or continue the access instruction accordingly.

* * * * *